United States Patent
Senoo

(10) Patent No.: US 12,062,499 B2
(45) Date of Patent: Aug. 13, 2024

(54) FILM CAPACITOR ELEMENT AND FILM CAPACITOR

(71) Applicant: KYOCERA Corporation, Kyoto (JP)

(72) Inventor: Yuki Senoo, Kirishima (JP)

(73) Assignee: KYOCERA CORPORATION, Kyoto (JP)

(*) Notice: Subject to any disclaimer, the term of this patent is extended or adjusted under 35 U.S.C. 154(b) by 137 days.

(21) Appl. No.: 17/785,258

(22) PCT Filed: Dec. 9, 2020

(86) PCT No.: PCT/JP2020/045815
§ 371 (c)(1),
(2) Date: Jun. 14, 2022

(87) PCT Pub. No.: WO2021/125006
PCT Pub. Date: Jun. 24, 2021

(65) Prior Publication Data
US 2023/0021057 A1    Jan. 19, 2023

(30) Foreign Application Priority Data

Dec. 20, 2019    (JP) .................................. 2019-230984

(51) Int. Cl.
*H01G 4/30* (2006.01)
*H01G 4/18* (2006.01)
(Continued)

(52) U.S. Cl.
CPC ................. *H01G 4/32* (2013.01); *H01G 4/18* (2013.01); *H01G 4/224* (2013.01); *H01G 4/30* (2013.01); *H01G 4/02* (2013.01)

(58) Field of Classification Search
CPC ............ H01G 4/224; H01G 4/30; H01G 4/32; H01G 4/02; H01G 4/18
See application file for complete search history.

(56) References Cited

U.S. PATENT DOCUMENTS 3,253,199 A * 5/1966 Cozens .................... H01G 4/32
361/313
6,407,905 B1    6/2002 Connolly et al.
(Continued)

FOREIGN PATENT DOCUMENTS

| CN | 204760235 U | 11/2015 |
|---|---|---|
| DE | 102014202067 A1 | 8/2015 |

(Continued)

*Primary Examiner* — David M Sinclair
(74) *Attorney, Agent, or Firm* — Volpe Koenig

(57) ABSTRACT

A body includes dielectric films, first electrode films, and second electrode films being stacked on one another or being wound together. A first external electrode is at one end of the body and electrically connected to the first electrode films. A second external electrode is at another end of the body and electrically connected to the second electrode films. The body includes a capacitance portion in which each of the first electrode films faces a corresponding second electrode film of the second electrode films with a corresponding dielectric film of the dielectric films in between, and the capacitance portion includes spaces each between a corresponding dielectric film of the dielectric films and a corresponding first electrode film of the first electrode films or between a corresponding dielectric film of the dielectric films and a corresponding second electrode film of the second electrode films.

4 Claims, 5 Drawing Sheets

(51) Int. Cl.
*H01G 4/224* (2006.01)
*H01G 4/32* (2006.01)
*H01G 4/02* (2006.01)

(56) References Cited

U.S. PATENT DOCUMENTS

| | | | | |
|---|---|---|---|---|
| 2016/0126016 A1* | 5/2016 | Hase | ........................ | H01G 4/30 |
| | | | | 361/301.4 |
| 2018/0090277 A1* | 3/2018 | Kikuchi | ................... | H02P 27/06 |
| 2021/0358693 A1* | 11/2021 | Ozasa | .................... | H01G 4/224 |
| 2022/0102072 A1* | 3/2022 | Inakura | ................... | H01G 4/015 |

FOREIGN PATENT DOCUMENTS

| | | | |
|---|---|---|---|
| JP | 51-93358 A | | 8/1976 |
| JP | 2015-70165 A | | 4/2015 |
| JP | 2015101677 A | * | 6/2015 |
| JP | 2015-211071 A | | 11/2015 |
| JP | 2016-219752 A | | 12/2016 |
| WO | 00/08661 A1 | | 2/2000 |

* cited by examiner

Heating
Evacuating

Cooling
Atmospheric pressure

FILM CAPACITOR ELEMENT AND FILM CAPACITOR

FIELD

The present disclosure relates to a film capacitor element and a film capacitor including the film capacitor element.

BACKGROUND

A known technique is described in, for example, Patent Literature 1.

CITATION LIST

Patent Literature

Patent Literature 1: Japanese Unexamined Patent Application Publication No. 2015-211071

BRIEF SUMMARY

A film capacitor element according to one aspect of the present disclosure includes a body including a plurality of dielectric films, a plurality of first electrode films, and a plurality of second electrode films being stacked on one another or being wound together, a first external electrode at one end of the body and electrically connected to the plurality of first electrode films, and a second external electrode at another end of the body and electrically connected to the plurality of second electrode films. The body includes a capacitance portion in which each of the plurality of first electrode films faces a corresponding second electrode film of the plurality of second electrode films with a corresponding dielectric film of the plurality of dielectric films in between, and the capacitance portion includes spaces each between a corresponding dielectric film of the plurality of dielectric films and a corresponding first electrode film of the plurality of first electrode films or between a corresponding dielectric film of the plurality of dielectric films and a corresponding second electrode film of the plurality of second electrode films.

A film capacitor according to one aspect of the present disclosure includes the film capacitor element, a housing accommodating the film capacitor element, and a sealant sealing the film capacitor element accommodated in the housing.

BRIEF DESCRIPTION OF DRAWINGS

The objects, features, and advantages of the present disclosure will be more apparent from the detailed description and the drawings below.

DETAILED DESCRIPTION

As the structure that forms the basis of the present disclosure, a film capacitor element and a film capacitor including a wound body with at least a pair of dielectric films each including an electrode film on the surface wound together, and a pair of metal-sprayed electrodes on both ends of the wound body are described. In this structure, the wound body includes an active portion in which electrode films in the pair of dielectric films overlap each other, and the diameter of the active portion is greater than the diameter of each metal-sprayed electrode in the cross section perpendicular to the winding axis of the wound body to reduce the volume ratio of each metal-sprayed electrode. The resultant film capacitor can have a smaller size and larger capacity.

One or more embodiments of the film capacitor element will now be described.

One or more embodiments of the present disclosure will now be described with reference to the drawings. The embodiments described below are mere examples of the present disclosure, and may be modified in various manners without departing from the spirit and scope of the present disclosure.

Figure 1:
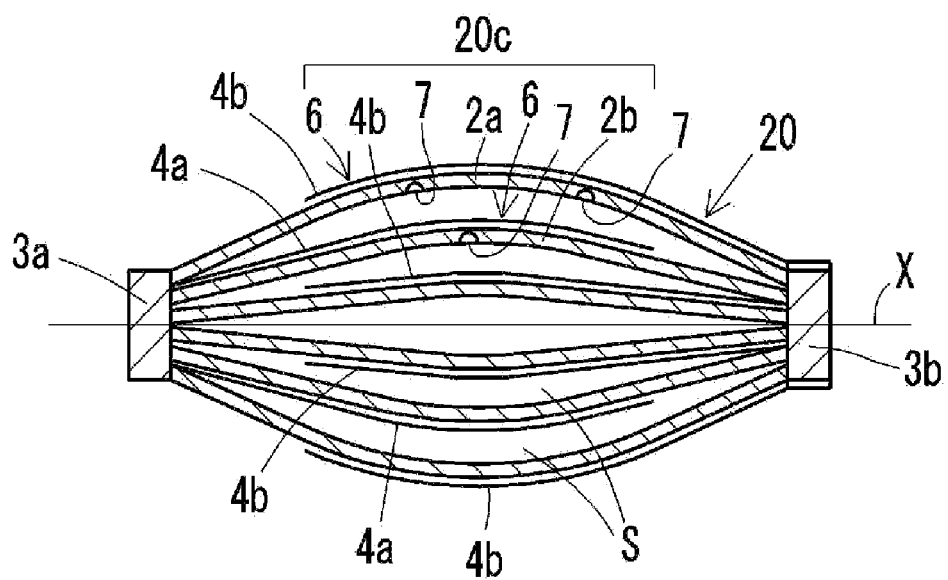
FIG. 1 is a schematic cross-sectional view of a film capacitor element according to one embodiment of the present disclosure, taken along one plane in a first direction X.

FIG. 1 is a schematic cross-sectional view of a film capacitor element according to one embodiment of the present disclosure, taken along one plane in a first direction X. A film capacitor element 1 includes a body 20 including multiple dielectric films 2a and 2b and film electrodes 6 including electrode films 4a and 4b on the surfaces of the dielectric films 2a and 2b stacked on one another or wound together. The film capacitor element 1 also includes a pair of external electrodes 3a and 3b on both ends of the body 20 in the first direction X connected to the electrode films 4a and 4b in the multiple film electrodes 6 to form a capacitance portion 20c (active portion). The capacitance portion 20c is at the middle between the ends of the body 20 in the first direction X. The body 20 has spaces S between the film electrodes 6. In other words, the dielectric films 2a and 2b are plastically deformed with the spaces S in the stacking direction. The width of each space S, or specifically, the distance in the stacking direction between adjacent film electrodes 6 across the space S, is, for example, at least 0.5 µm. The width of each space S may be, for example, one or more times the thickness of the dielectric film 2a or 2b, or two or more times the thickness of the dielectric film 2a or 2b. Each film electrode 6 has multiple microscopic recesses 7 on its surface.

Each recess 7 may be replaced by a hole that is circular, oval, polygonal, or star-shaped in a plan view, or a groove that is linear, arc-shaped, or dendritic in a plan view. Each recess 7 may also be replaced by two or more holes or grooves connected together. The depth of each recess 7 may be, for example, 10 nm or greater and less than or equal to half the thickness of the dielectric film 2a or 2b. For each recess 7 being replaced by a hole, the diameter of the recess 7 in a plan view may be, for example, from 10 nm to 2 µm inclusive. For each recess 7 being replaced by a groove, the width of the recess 7 in a plan view may be, for example, from 10 nm to 2 µm inclusive, and the length may be, for example, 200 µm or less. The density of the recesses 7 may be, for example, 1 to 1000 recesses/mm² or less.

The recesses 7 have the ratio of the diameter to the depth of the hole (diameter/depth) or the ratio of the width to the depth of the groove (width/depth) being 3 or less.

The dielectric film 2a or 2b may be simply referred to as the dielectric film 2. The electrode film 4a or 4b may be simply referred to as the electrode film 4.

The film capacitor element 1 may be fabricated with the procedure described below. The dielectric film 2 is prepared first. The dielectric film 2 is obtained by, for example, preparing a resin solution by dissolving an insulating resin in a solvent, applying the resin solution on the surface of a base film of, for example, polyethylene terephthalate (PET) in a sheet, and drying the sheet to volatilize the solvent. The sheet may be applied with a method selected as appropriate from known film deposition methods including doctor blading, die coating, and knife coating. Examples of the solvent used for the sheet include methanol, isopropanol, n-butanol, ethylene glycol, ethylene glycol monopropyl ether, methyl ethyl ketone, methyl isobutyl ketone, xylene, propylene glycol monomethyl ether, propylene glycol monomethyl ether acetate, dimethylacetamide, cyclohexane, and an organic solvent containing a mixture of two or more solvents selected from the above solvents. The dielectric film 2 can also be formed by stretching a film of resin formed by melt extrusion.

The dielectric film 2 may have the thickness of, for example, 5 μm or less, or specifically the thickness of 0.5 to 2 μm.

Examples of the insulating resin for the dielectric film 2 include polypropylene (PP), PET, polyphenylene sulfide (PPS), polyethylene naphthalate (PEN), polyarylate (PAR), polyphenylene ether (PPE), polyetherimide (PEI), and cycloolefin polymers (COPs). The insulating resin may specifically be COPs having a high insulation breakdown voltage.

The dielectric film 2 may contain the insulating resin selected from the above examples alone or may include other materials. The materials that may be included in the dielectric film 2 other than the resin include, for example, the above organic solvent and an inorganic filler. Examples of the inorganic filler include an inorganic oxide such as alumina, titanium oxide, or silicon dioxide, an inorganic nitride such as silicon nitride, and glass. In particular, a material with a high relative dielectric constant such as a composite oxide having a perovskite structure may be used as an inorganic filler. In this case, the dielectric film 2 has a higher relative dielectric constant across the film. The film capacitor using this dielectric film 2 can have a smaller size. The inorganic filler may be surface-treated by, for example, silane coupling treatment or titanate coupling treatment.

Figure 2A:
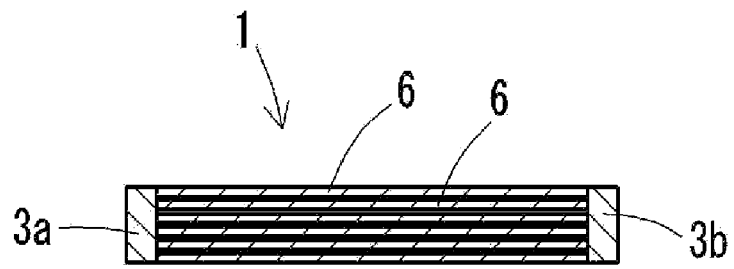
FIG. 2A is a diagram describing a procedure for expanding air and other gases remaining in film electrodes.
Figure 2A:
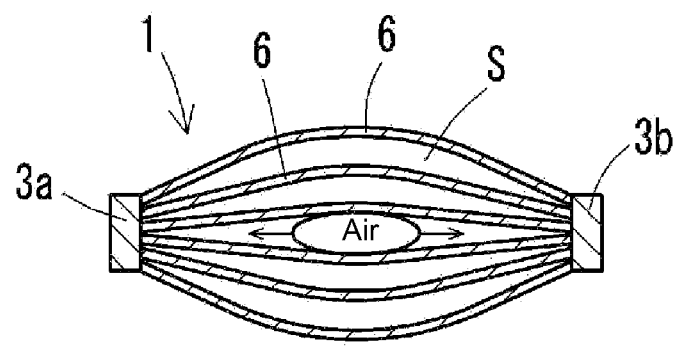
Figure 2A:
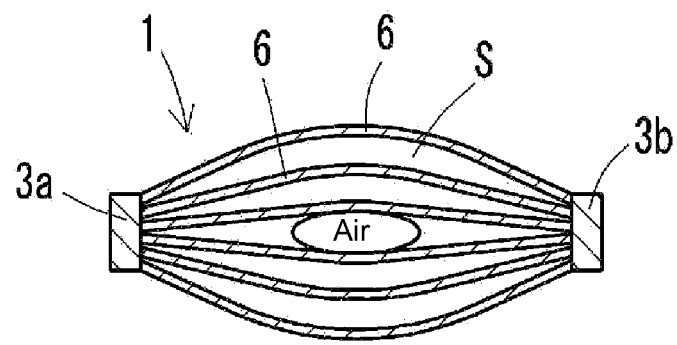

FIG. 2A is a diagram describing a procedure for expanding air and other gases remaining in the film electrodes 6. In FIG. 2A, the electrode films 4 are eliminated for ease of illustration. The film capacitor element 1 including the film electrodes 6 with the multiple microscopic recesses 7 being stacked may be, for example, heated to expand air remaining in the microscopic recesses 7. The expanded air enters between the film electrodes 6, forming the spaces S between the film electrodes 6. The dielectric film 2 is plastically deformed with the spaces S being formed. When the film capacitor element 1 is cooled, the spaces S remain between the film electrodes 6.

In some embodiments, the film capacitor element 1 including the film electrodes 6 with the multiple microscopic recesses 7 being stacked may be accommodated in a container, and the container accommodating the film capacitor element 1 may be evacuated to expand the air in the microscopic recesses 7 on the film electrode 6. The expanded air enters between the film electrodes 6, forming the spaces S between the film electrodes 6. The dielectric film 2 is plastically deformed with the spaces S being formed. When the container accommodating the film capacitor element 1 is under the atmospheric pressure, the spaces S remain between the film electrodes 6.

In some embodiments, the film capacitor element 1 including the film electrodes 6 with the multiple microscopic recesses 7 being stacked may be accommodated in a container. The container accommodating the film capacitor element 1 may be evacuated, and the film capacitor element 1 may be heated to expand the air in the recesses 7 on the film electrode 6 more easily.

Figure 2B:
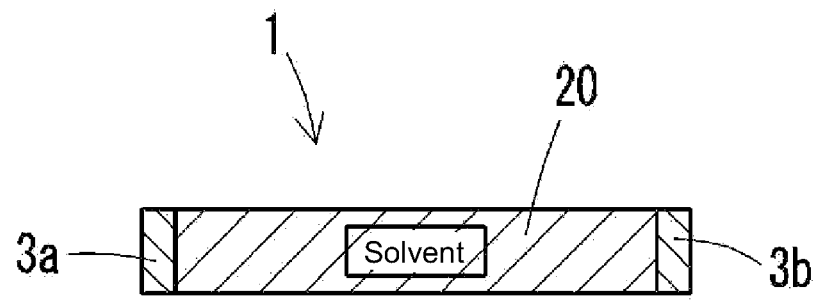
FIG. 2B is a diagram describing a procedure for vaporizing and expanding a solvent remaining in the film electrodes.
Figure 2B:
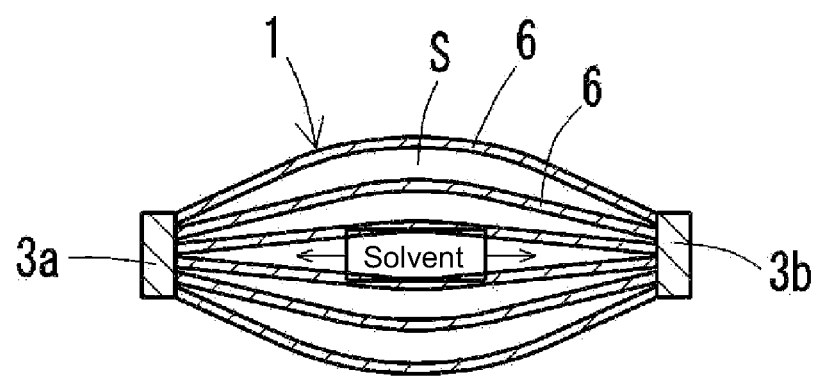
Figure 2B:
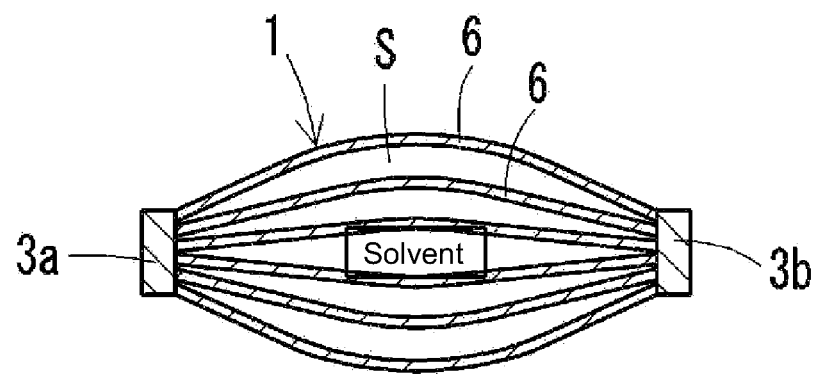

FIG. 2B is a diagram describing a procedure for vaporizing a solvent remaining in the film electrodes 6. In FIG. 2B, the electrode films 4 are eliminated for ease of illustration. The film capacitor element 1 including the film electrodes 6 being stacked may be, for example, heated to vaporize the solvent remaining between the film electrodes 6. The vaporized solvent enters between the film electrodes 6 to form the spaces S between the film electrodes 6. The dielectric film 2 is plastically deformed with the spaces S being formed. When the film capacitor element 1 is cooled, the spaces S remain between the film electrodes 6.

Figure 3:
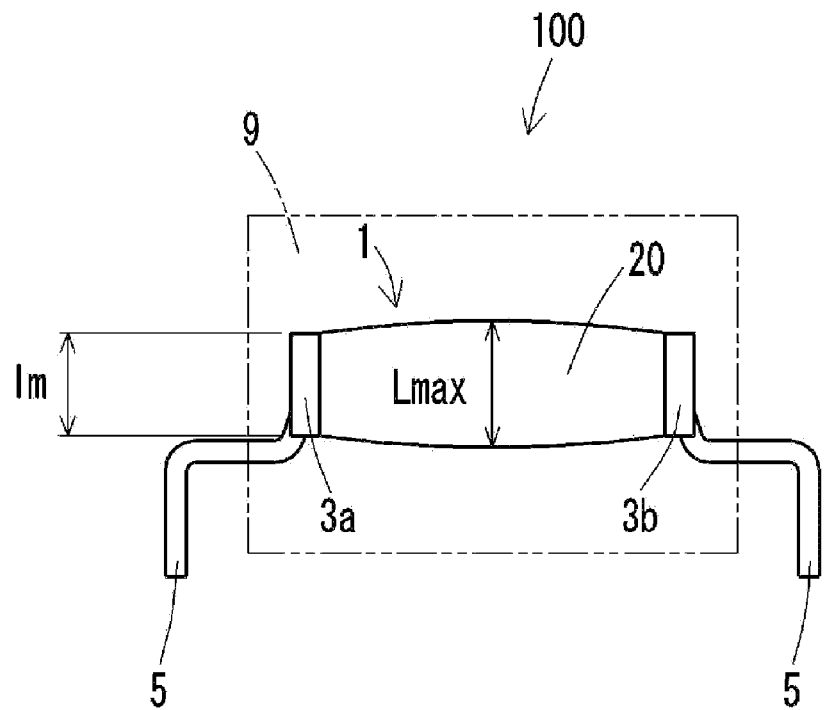
FIG. 3 is a diagram of the film capacitor element encapsulated with a resin.

FIG. 3 is a diagram of the film capacitor element 1 encapsulated with a resin. $L_{max}-1_m$ is the maximum thickness difference, and $(L_{max}-1_m)/1_m \times 100$ is the maximum expansion rate (%) in the stacking direction, where $L_{max}$ is the dimension of the expanded body 20 in the stacking direction, and $1_m$ is the dimension of the external electrode 3a or 3b in the stacking direction. The maximum thickness difference and the maximum expansion rate in the stacking direction are both greater than 0. The maximum thickness difference may be, for example, greater than or equal to the thickness of the dielectric film 2 or greater than or equal to 0.5 μm. The maximum expansion rate in the stacking direction may be 100% or less, 50% or less, or specifically 25% or less. Terminals 5 are connected to the external electrodes 3a and 3b.

Figure 4:
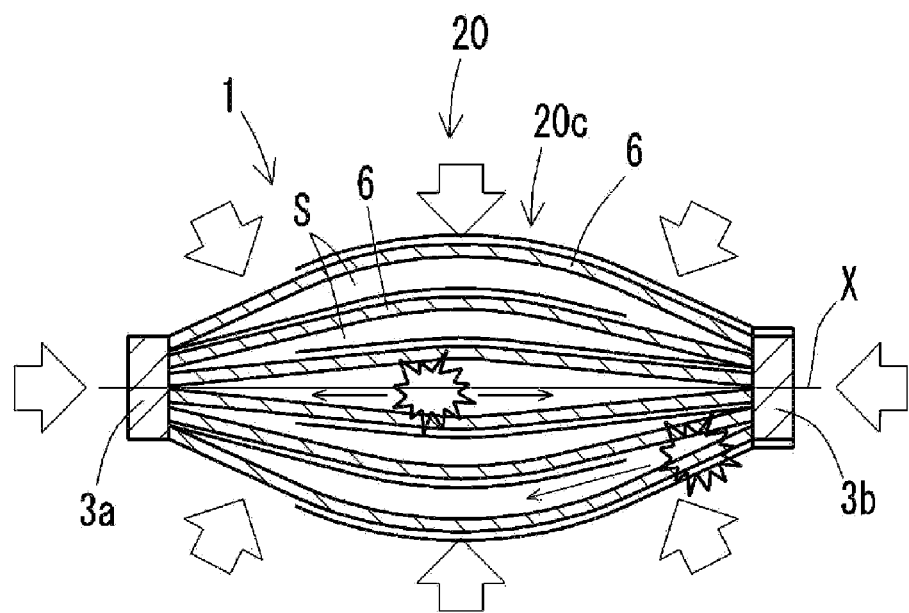
FIG. 4 is a schematic diagram describing the pressure from the resin encapsulation applied to the film capacitor element.

FIG. 4 is a schematic diagram describing the pressure from the resin encapsulation applied to the film capacitor element 1. The dielectric film 2 in each layer is plastically deformed with the capacitance portion 20c between the pair of external electrodes 3a and 3b expanding in the stacking direction and the spaces S between the film electrodes 6 in the layers. The pressure applied to the capacitance portion 20c in the stacking direction is reduced with air or other gases in the spaces S between the film electrodes 6 in the layers. The gases in the spaces S may flow from gaps around the external electrodes 3a and 3b into the spaces S in the other layers. This further reduces the pressure applied to the capacitance portion 20c.

This structure reduces the likelihood of high pressure being applied to the capacitance portion 20c in the stacking direction and reduces thermal damage to the film electrodes 6 due to contact between the film electrodes 6 under high pressure and thus reduces breaks from any short circuit.

The spaces S may be formed at least partially in the stacking direction of the body 20. The spaces S may extend over both ends of the body 20 in the first direction X, or may extend partially between the two ends.

Figure 5:
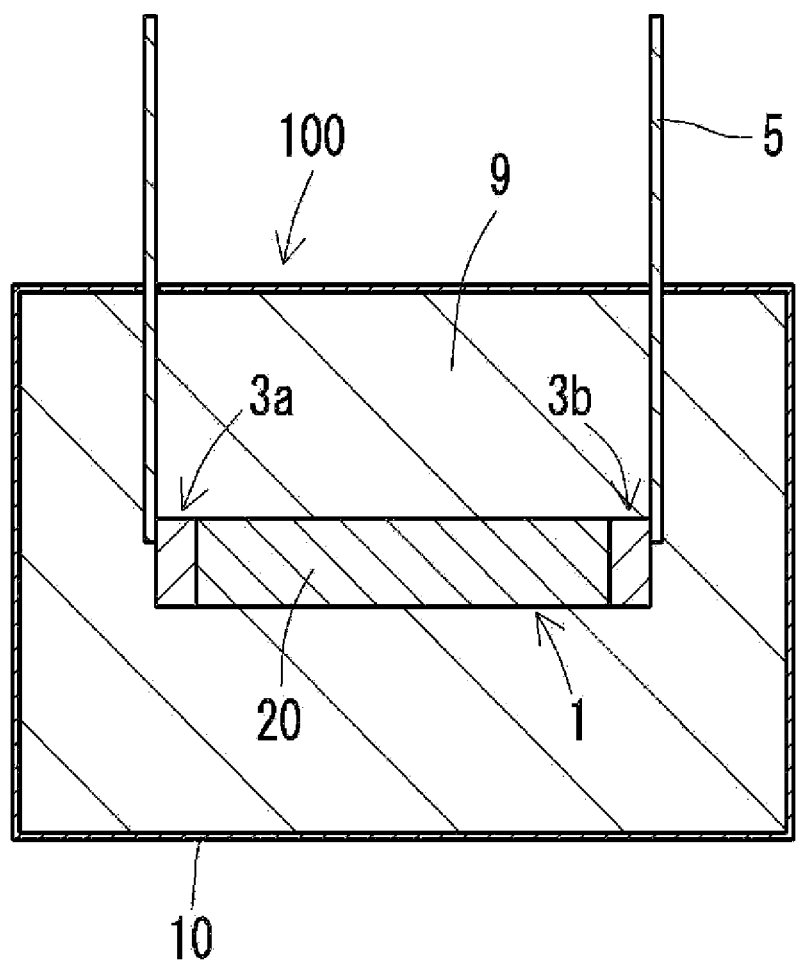
FIG. 5 is a schematic cross-sectional view of a film capacitor according to one embodiment of the present disclosure.

FIG. 5 is a schematic cross-sectional view of a film capacitor according to one embodiment. A film capacitor 100 includes the film capacitor element 1 according to the above embodiment, a housing 10 accommodating the film capacitor element 1, and a sealant 9 sealing the film capacitor element 1 accommodated in the housing 10. The sealant 9 is, for example, a resin. The film capacitor 100 can be less susceptible to breaks due to a short circuit and is highly reliable. The film capacitor element is not limited to the film capacitor element 1 described in FIGS. 1 to 4, but may be any other film capacitor element.

In another embodiment, the electrode films 4a and 4b and the dielectric films 2a and 2b without being joined together may be stacked on one another or wound together, without the electrode films 4a and 4b being formed on the dielectric films 2a and 2b. In some embodiments, the film electrode 6 including the dielectric film 2a with an electrode film 4a on one surface of the dielectric film 2a and an electrode film 4b on the other surface of the dielectric film 2a, and the dielectric film 2b with no electrode films 4a and 4b may be stacked on one another or wound together.

The present disclosure may be implemented in the following forms.

A film capacitor element according to one aspect of the present disclosure includes a body including a plurality of dielectric films, a plurality of first electrode films, and a plurality of second electrode films being stacked on one another or being wound together, a first external electrode at one end of the body and electrically connected to the plurality of first electrode films, and a second external electrode at another end of the body and electrically connected to the plurality of second electrode films. The body includes a capacitance portion in which each of the plurality of first electrode films faces a corresponding second electrode film of the plurality of second electrode films with a corresponding dielectric film of the plurality of dielectric films in between, and the capacitance portion includes spaces each between a corresponding dielectric film of the plurality of dielectric films and a corresponding first electrode film of the plurality of first electrode films or between a corresponding dielectric film of the plurality of dielectric films and a corresponding second electrode film of the plurality of second electrode films.

A film capacitor according to one aspect of the present disclosure includes the film capacitor element, a housing accommodating the film capacitor element, and a sealant sealing the film capacitor element accommodated in the housing.

The film capacitor element and the film capacitor according to the embodiments of the present disclosure can reduce breaks due to a short circuit and are highly reliable.

Although the embodiments of the present disclosure have been described in detail, the present disclosure is not limited to the above embodiments, and may be modified or changed variously without departing from the spirit and scope of the present disclosure. The components described in the above embodiments may be entirely or partially combined as appropriate unless any contradiction arises.

REFERENCE SIGNS LIST

100 film capacitor
1 film capacitor element
2a, 2b dielectric film
3a, 3b external electrode
4a, 4b electrode film
20 body
20c capacitance portion
6 film electrode
9 sealant
S space

The invention claimed is:

1. A film capacitor element, comprising:
a body including a plurality of dielectric films, a plurality of first electrode films, and a plurality of second electrode films being stacked on one another or being wound together;
a first external electrode at one end of the body and electrically connected to the plurality of first electrode films; and
a second external electrode at another end of the body and electrically connected to the plurality of second electrode films,
wherein the body includes a capacitance portion in which each of the plurality of first electrode films faces a corresponding second electrode film of the plurality of second electrode films with a corresponding dielectric film of the plurality of dielectric films in between,
the capacitance portion includes spaces each between a corresponding dielectric film of the plurality of dielectric films and a corresponding first electrode film of the plurality of first electrode films or between a corresponding dielectric film of the plurality of dielectric films and a corresponding second electrode film of the plurality of second electrode films, and
wherein a maximum thickness difference $L_{max}-1_m$ is greater than or equal to the thickness of the dielectric film, wherein $L_{max}$ is the dimension of the body in a stacking direction and $1_m$ is the dimension of the first external electrode or the second external electrode in the stacking direction.

2. The film capacitor element according to claim 1, further comprising:
a plurality of film electrodes each including, on a surface of each of the plurality of dielectric films, a first electrode film of the plurality of first electrode films or a second electrode film of the plurality of the second electrode films,
wherein a surface of each of the plurality of film electrodes has a plurality of microscopic recesses, wherein a depth of each recess is 10 nm or greater and less than or equal to half of the thickness of the dielectric film.

3. The film capacitor element according to claim 1, wherein
each space has a width in a stacking direction of the films being greater than or equal to a thickness of each of the plurality of dielectric films.

4. A film capacitor, comprising:
the film capacitor element according to claim 1;
a housing accommodating the film capacitor element; and
a sealant sealing the film capacitor element accommodated in the housing.

* * * * *